United States Patent [19]

Corey et al.

[11] Patent Number: 4,545,341
[45] Date of Patent: Oct. 8, 1985

[54] MEANS AND METHOD OF BALANCING MULTI-CYLINDER RECIPROCATING MACHINES

[75] Inventors: John A. Corey, North Troy; Michael M. Walsh, Schenectady, both of N.Y.

[73] Assignee: Mechanical Technology Incorporated, Latham, N.Y.

[21] Appl. No.: 605,854

[22] Filed: May 1, 1984

[51] Int. Cl.[4] .............................................. F16F 15/22
[52] U.S. Cl. .............................. 123/192 B; 123/192 R; 74/604
[58] Field of Search ....................... 123/192 R, 192 B; 74/603, 604

[56] References Cited

U.S. PATENT DOCUMENTS

| | | | |
|---|---|---|---|
| 1,163,832 | 12/1915 | Lanchester | 123/192 B |
| 1,898,459 | 2/1933 | Newcomb | 74/604 |
| 2,304,892 | 12/1942 | Dickson | 74/604 |
| 4,000,666 | 1/1977 | Ito et al. | 74/604 |

FOREIGN PATENT DOCUMENTS

| | | | |
|---|---|---|---|
| 844071 | 8/1960 | United Kingdom | 123/192 B |
| 972544 | 10/1964 | United Kingdom | 123/192 R |

Primary Examiner—Ira S. Lazarus
Assistant Examiner—R. S. Bailey
Attorney, Agent, or Firm—Joseph V. Claeys; Charles W. Helzer

[57] ABSTRACT

A virtual balancing axis arrangement is described for multi-cylinder reciprocating piston machines for effectively balancing out imbalanced forces and minimizing residual imbalance moments acting on the crankshaft of such machines without requiring the use of additional parallel-arrayed balancing shafts or complex and expensive gear arrangements. The novel virtual balancing axis arrangement is capable of being designed into multi-cylinder reciprocating piston and crankshaft machines for substantially reducing vibrations induced during operation of such machines with only minimal number of additional component parts. Some of the required component parts may be available from parts already required for operation of auxiliary equipment, such as oil and water pumps used in certain types of reciprocating piston and crankshaft machine so that by appropriate location and dimensioning in accordance with the teachings of the invention, the virtual balancing axis arrangement can be built into the machine at little or no additional cost.

16 Claims, 24 Drawing Figures

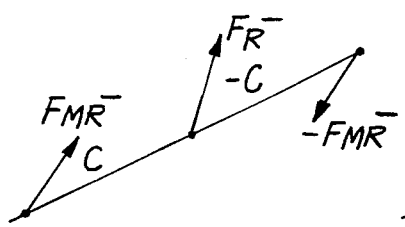
Fig. 7A
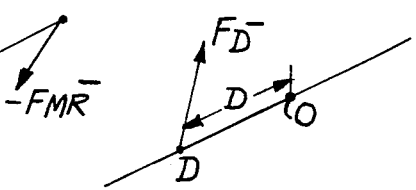
Fig. 7B
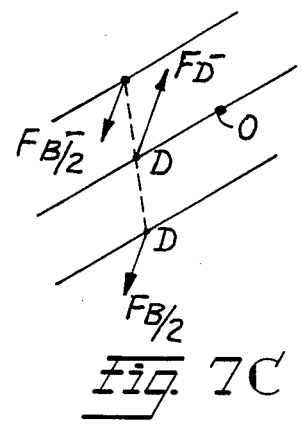
Fig. 7C
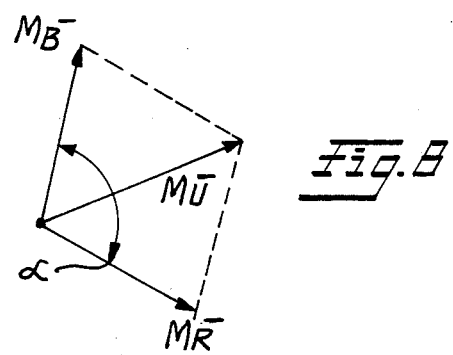
Fig. 8
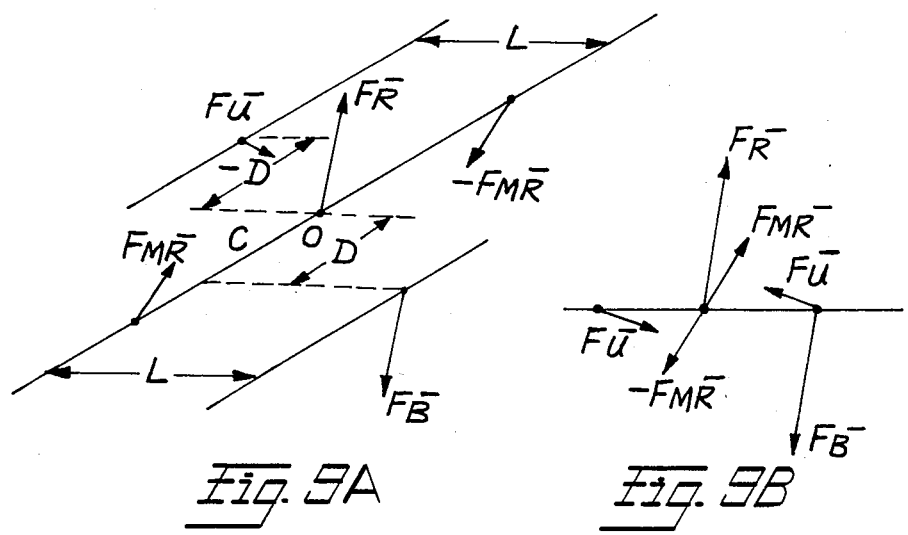
Fig. 9A
Fig. 9B

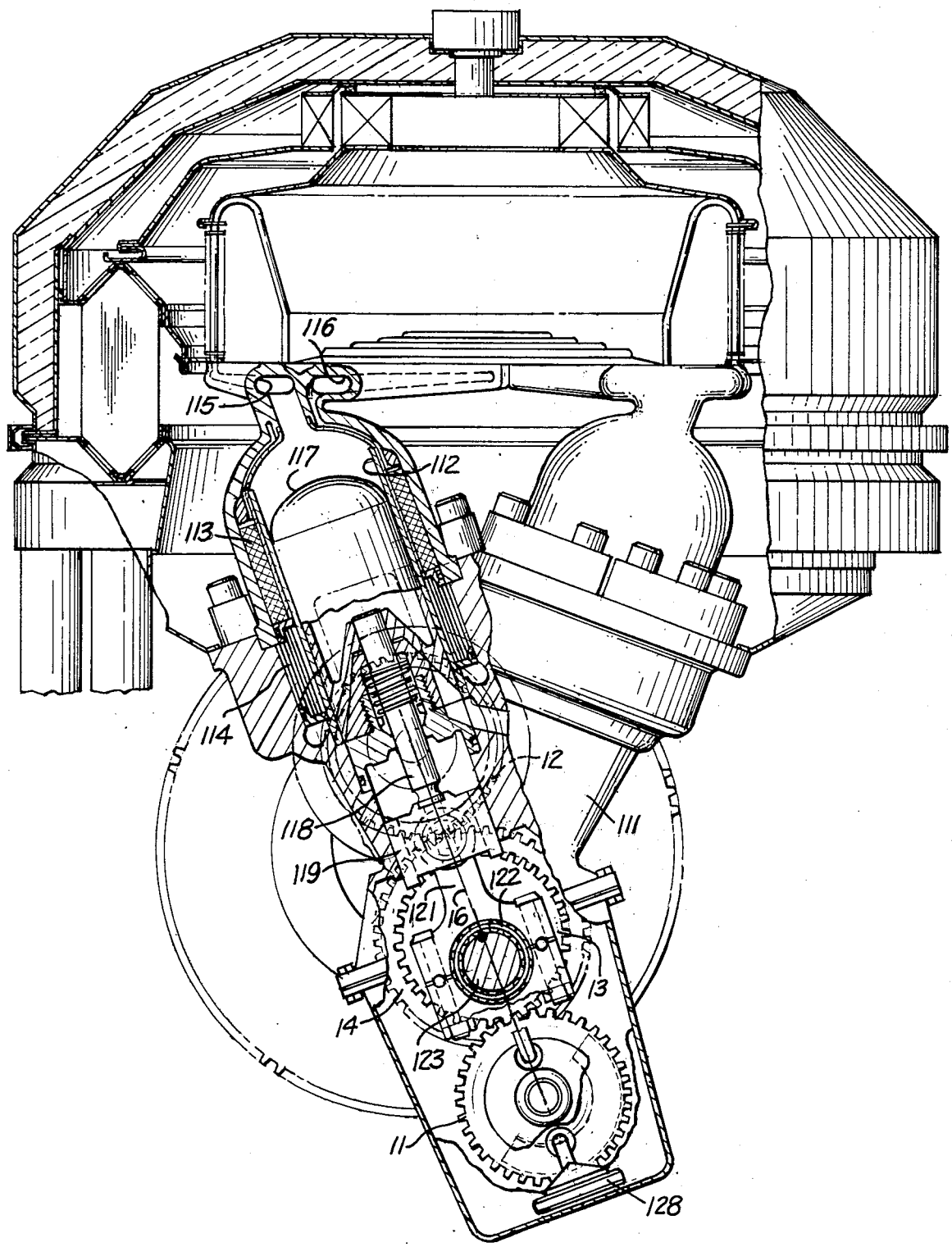

MEANS AND METHOD OF BALANCING MULTI-CYLINDER RECIPROCATING MACHINES

The Government of the United States of America has rights in this invention pursuant to Contract DEN3-32 awarded by the United States Department of Energy.

TECHNICAL FIELD

This invention relates to multi-cylinder reciprocating piston machines such as hot gas engines of the Stirling type, piston driven internal combustion engines, piston compressor machines, and the like.

More particularly, the invention relates to a novel means and method for effectively balancing out forces acting on the crankshaft of such machines and minimizing the moments without requiring the use of additional parallel-arrayed balancing shafts or complex and expensive gear arrangements, and capable of being designed into reciprocating piston machines for substantially reducing or eliminating vibrations induced during operation thereof with only a minimal number of additional component parts some of which may be already available from parts required for operation of auxiliary equipment used with certain types of reciprocating piston machine systems.

BACKGROUND PRIOR ART

It is well known in the prior art that the inertial forces due to reciprocating and rotating masses in reciprocating engines can be minimized or cancelled by an appropriate counterbalance arrangement. Broadly, such prior arrangements for attempting to obtain complete engine balance have included the provision of additional balance weights disposed at opposite ends of the crankshaft which rotate at the same speed as the crankshaft but in the opposite direction. These balance weights have often been disposed on separate, additional, rotating shafts as shown, for example, in U.S. Pat. No. 4,414,934. In U.S. Pat. No. 3,415,237 the balance weights are provided at opposite ends of the crankshaft itself and concentric with the crankshaft. This avoids the requirement for additional, separate, rotating shafts but at the expense of requiring complex and expensive drive gearing. Various attempts have also been made to reduce the space required in the engine to achieve such balancing by rotatably mounting the balance weights on other already existing rotating shafts, such as on the camshaft of an internal combustion engine as shown in U.S. Pat. No. 3,203,274. It has also been known to use one or more of the additional rotating balancing shafts for driving auxiliary equipment, such as an oil pump. Further, in U.S. Pat. No. 3,759,238 there is shown a specific balancing arrangement of the foregoing described type for a single cylinder engine wherein the balance weights are rotatably mounted on extensions of dowell pins which are provided in the engine to achieve registry of the two sections of the housing/crankcase of a two-cycle type of internal combustion engine.

For example, reciprocating piston machines such as piston driven internal combustion engines, compressors and the like contain masses which are constrained to move in a reciprocating manner generally perpendicular to a rotating component known as a crankshaft. In order to balance the forces generated by the reciprocating masses, eccentric masses are located on the rotating elements such as the crankshaft. However, a reciprocating force as shown in FIG. 1A of the drawings, which is spatially fixed but has variable amplitude, can also be represented by the summation of two counter-rotating, fixed amplitude forces of half the peak amplitude of the reciprocating force as shown in FIG. 1B of the drawings. It follows from this analysis that the eccentric masses normally used on a rotating crankshaft component for balancing the crankshaft generate fixed-amplitude, rotating forces, and therefore can balance only half of the initial reciprocating imbalance, leaving a counter-rotating, fixed-amplitude, force.

The above analysis is depicted in FIGS. 1A and 1B wherein in FIG. 1A the generation of reciprocating forces by connection of a piston and crankshaft is illustrated together with the identification of the important parameters of this reciprocating system. The imbalance force produced by this system is given by the expression:

$$F_y = mr\omega^2 \sin \theta \tag{1}$$

Where m equals the mass of the reciprocating piston, r is the radious of the throw arm of the crankshaft and $\omega$ is the angular speed of rotation of the crankshaft, t equals time, and $\theta$ equals $\omega t$. FIG. 1B illustrates how the spatially fixed, variable-amplitude, imbalance force, $F_y$ can be equivalently expressed as two counter-rotating, fixed-amplitude forces, $F_R+ F_R-$ each of whose values are given by the expressions:

$$F_R+ = \frac{mr\omega^2}{2} \text{ and } F_R- = \frac{mr\omega^2}{2} \tag{2}$$

If the resultant fixed amplitude counter-rotating forces are vectorially added, it will be seen that the vector addition along the x axis always equals 0. However, it will be noted that the vectorial components along the y (or vertical axis) do not sum to zero since $F_yR+ = R_R + \sin \omega t$ and $F_yR- = F_R \sin \omega t$ which sum to $F_y = mr\omega^2 \sin \omega t$. This is the algebraic expression for the basic imbalance force present in a reciprocating piston system before an attempt of balancing in a conventional, normal manner by attaching an eccentric weight to the crankshaft of the machine 180° out-of-phase with the piston mass, which weight cancels one-half the imbalance, specifically $F_R+$.

To eliminate the remaining imbalance defined in the expression set forth above, a second rotating component has been added by providing a second parallel shaft connected to the first rotating shaft so as to assure a fixed phase relationship between the two rotating systems and to cause them to rotate in opposite direction. Eccentric balancing masses can then be added to the additional shaft to balance the residual counter-rotating imbalance of the crankshaft. Such arrangement is illustrated by the vector diagram shown in FIGS. 2A through 2D. FIG. 2A illustrates the nature of the reciprocating unbalance force $F_y$ discussed in the preceding paragraph. As noted above, this reciprocating imbalance force can be resolved into two fixed amplitude counter-rotating forces $F_R-$ and $F_R+$ as shown in FIG. 2B of the drawings. It is the usual practice in the industry to balance out one of these components by an eccentric weight secured to the rotating crankshaft. The size (mass) and phase relation of such a balancing weight is illustrated by the vector quantity $F_B+$ in FIG. 2C. It will be appreciated from FIG. 2C that the vector quantity $F_B+$ will exactly cancel out the rotating component $F_R+$ but leaves a remaining imbalance force $F_R-$. In the past, efforts to balance out the remaining imbalance force represented by the vector component $F_R-$ in FIG. 2C and in FIG. 2D have resulted in the addition of a second shaft spaced from the first shaft a distance $x_s$ and rotated in a direction counter to the direction of rotation of the crankshaft. Fixed to the additional shaft is an eccentric mass represented by the vector quantity $F_B-$ which it is noticed will rotate to exactly balance out the imbalance force $F_R-$. This approach can be seen to provide a total balancing of the reciprocating imbalance forces, but because of the offset distance ($x_s$ in FIG. 2D) between the two shafts and therefore the centers of force rotation, a moment is induced. This moment is in a form of reciprocating torque ($T = F_B-(x_s)$) about an axis parallel to the shafts. This reciprocating torque is referred to as a "rocking couple." To minimize this rocking couple effect, the distance $x_s$ must be minimized. Alternatively, at extra cost and space, a second extra shaft may be added on the other side of the main shaft to share the balancing duty by splitting the balancing force $F_B-$ into two equal forces rotating in the same direction but disposed from the main shaft to be balanced by a distance $x_s$ and on the opposite side of the shaft another distance $-x_s$ from the main shaft. With such a two balancing shaft arrangement, the net residual torque is given by the expression:

$$T = \frac{F_{B-}}{2}(x_s) + F_{B-}(-x_s) = 0$$

The effect of the two balancing shaft technique is to put the line of action of the balancing force into the same location as the line of action of the original imbalance and to simulate concentric counter-rotating shafts in a manner disclosed in U.S. Pat. No. 3,415,237 issued Dec. 10, 1968, to J. R. Harkness for an "An Internal Combustion Engine Imbalancing Means Therefore."

SUMMARY OF THE INVENTION

It is an object of this invention to provide a means and method of balancing a multi-cylinder reciprocating piston machine which is capable of eliminating the imbalancing forces while at the same time minimizing the residual imbalance moments without requiring additional rotating balancing shafts or complex gearing.

It is another object of this invention to provide a means and method of balancing multi-cylinder reciprocating piston machines which is capable of eliminating the imbalance forces as well as minimizing the residual moments without the need of additional balance shafts on separately provided counterbalance weights—i.e. the required counterbalance weights can be provided as part of the working members of required machine auxiliary devices, such as an oil pump, water pump, or the like.

Briefly stated, in accordance with one embodiment of the invention the balancing means for a multi-cylinder reciprocating piston machine includes first and second appropriately sized eccentric weights arranged for rotation at the same speed as that of the crankshaft but in the opposite direction. The first and second eccentric weights are disposed on opposite sides of the axis of rotation of the crankshaft and at preselected distances in opposite directions from the center of action of the imbalance forces acting on the crankshaft. With this arrangement the imbalance forces are eliminated while at the same time the residual moments are minimized. To further simplify the balancing means the first and second eccentric weights can be arranged to be carried by or be a part of the working members of already required auxiliary devices such as an oil pump, a water pump, or the like.

BRIEF DESCRIPTION OF THE DRAWINGS

These and other objects, features and many of the attendant advantages of this invention will be appreciated more readily as the same becomes better understood from a reading of the following detailed description, when considered in connection with the accompanying drawings, wherein like parts in each of the several figures are identified by the same reference characters, and wherein:

FIGS. 7A and 7B are diagramatic sketches illustrating the resolution of co-planar force and moment into a single force at D;

FIG. 7C is a diagramatic sketch illustrating the required position of balancing weights to achieve total moment balance when $\alpha$ equals zero;

FIG. 8 is a diagramatic sketch illustrating the vector sum of $M_B-$, $M_R- = M_u-$;

FIGS. 9A and 9B are diagramatic sketches showing a total balance system in accordance with the present invention (FIG. 9A being an isometric view and FIG. 9B being a view along shafts) which minimizes the residual moment.

FIG. 10 is a cross sectional view of a new and improved hot gas multi-cylinder Stirling engine having a Vee block of compact construction and using a balancing arrangement constructed according to the invention;

BEST MODE OF PRACTICING THE INVENTION

It is known that multi-cylinder machines with even numbers of cylinders can be arranged such that the forces associated with the cylinders are phased and directed in such a way as to eliminate, by mutual cancellation, those moments which certain of the balancing systems of the prior art minimize. Examples of such cylinder arrangements are: in-line, 4, 6, or 8 cylinders; 90° V, 4 or 8 cylinders; 60° or 120° V, 6 or 12 cylinders. Most commonly-used multi-cylinder machines are presently made in one of the foregoing configurations because of the need to avoid moment imbalances inherent in other multi-cylinder arrangements. However, in recent years, needs for other arrangements (such as 3 cylinder in-line, 5 cylinder in-line, 90° V-6 cylinder, and narrow-angle V-4 cylinder) are often desired to suit tighter packaging and power-to-weight requirements. It is to these engines and other multi-cylinder reciprocating piston machines of like or similar type and arrangement that the present invention is intended to be applied for the complete balancing of the intrinsic imbalance forces while also minimizing the intrinsic imbalance moments without requiring two complete length balancing shafts or complex gearing.

In machinery with multiple cylinders, the attachment of the pistons, and therefore the axes of the cylinders and reciprocating forces, are necessarily spaced along the length of the crankshaft. Further, the phases of these cylinders are generally not the same as one another, and it is not necessarily true that all the axes lie in a single plane or in-line arrangement (witness, specifically, V-type engines). The spacing, phasing and directional differences between these multiple cylinders and their associated force axes, give rise to moments or torques of time-variant magnitude about fixed axes perpendicular to the crankshaft axis.

Figure 1A:
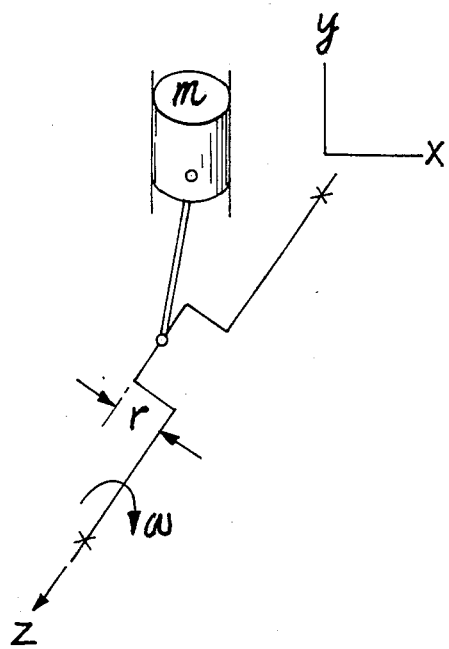
FIGS. 1A and 1B are diagrammatic sketches illustrating the nature of the unbalance reciprocating force acting on the crankshaft of a reciprocating piston and crankshaft machine.
Figure 1B:
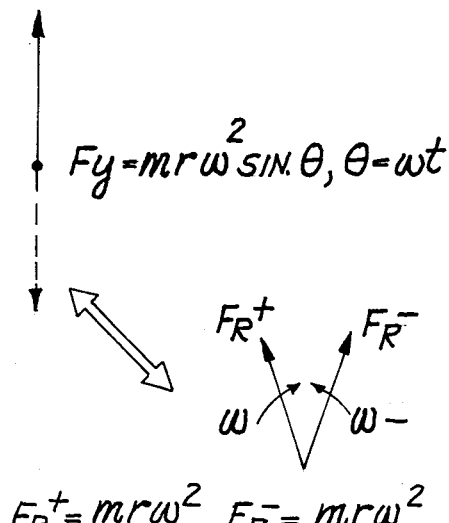
Figure 2A:
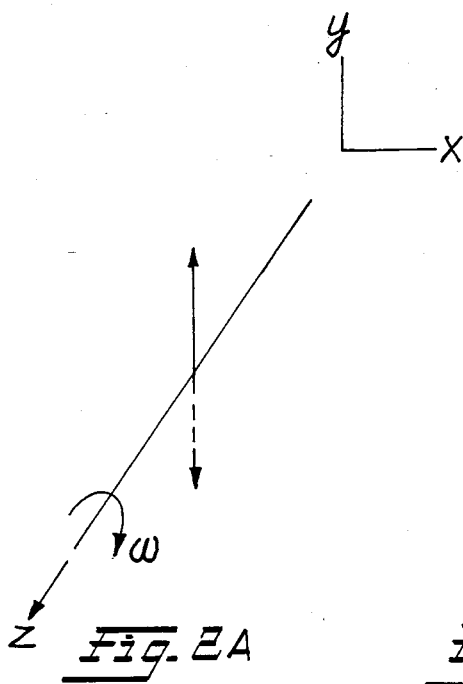
FIGS. 2A, 2B, 2C, and 2D are diagramatic sketches illustrating how the reciprocating imbalance force shown in FIG. 1 can be resolved into two counter-rotating equal amplitude forces and depict techniques used to at least partially balance reciprocating forces.
Figures 2B, 2C:
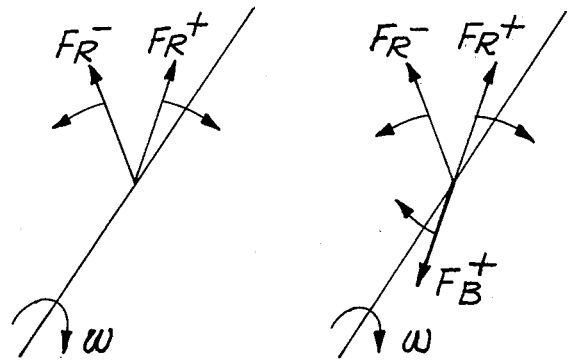
Figure 2D:
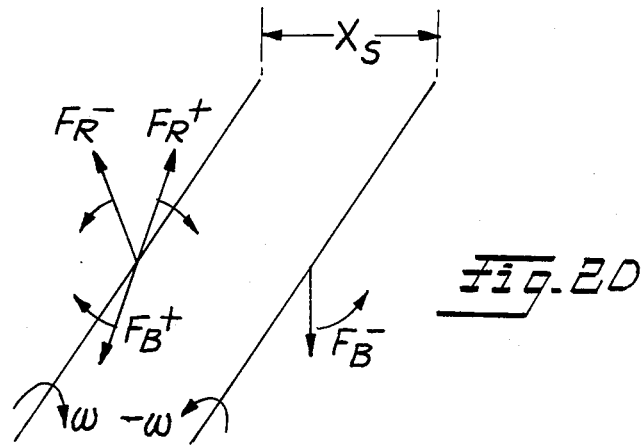
Figures 3A, 3B:
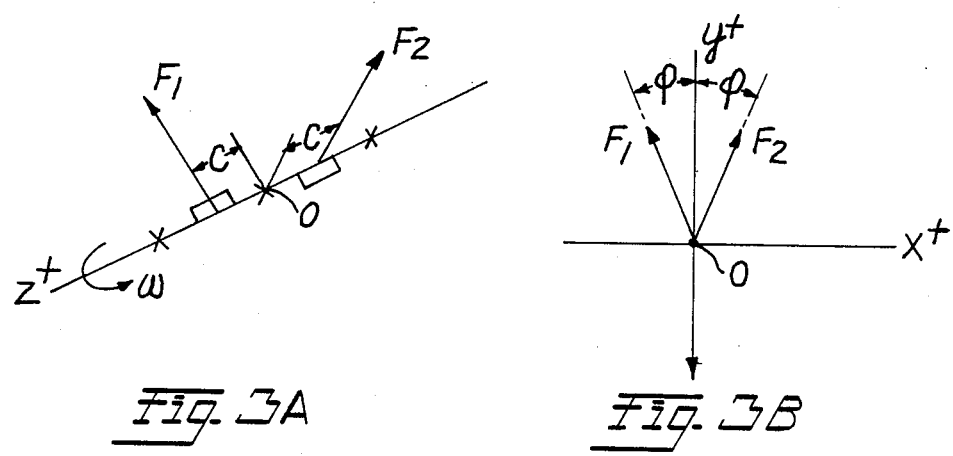
FIGS. 3A and 3B are diagramatic sketches illustrating the reciprocating forces in a 2-cylinder V-engine.

Consider, as an example, a V-type two-cylinder engine as shown schematically in FIGS. 3A and 3B. Cylinder 1 creates $F_1$, defined:

$$F_1 = MR\omega^2 \cos \omega t \qquad (4)$$

Figures 4A, 4B:
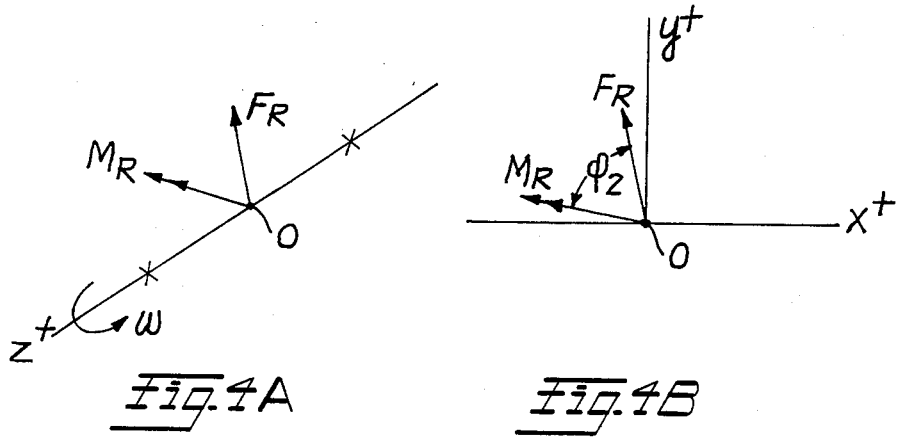
FIGS. 4A and 4B are diagramtic sketches illustrating resolved forces and moments for general multi-cylinder machines.

Then cylinder 2 creates $F_2$ which is, typically, of equal magnitude to $F_1$, but phased away in time and directed along an axis spaced a distance 2C away, measured along the crankshaft and describing a V-angle between $F_1$ and $F_2$ of $2\phi$, such that $F_2 = MR\omega^2 \cos(\omega t + \theta)$ As illustrated in FIGS. 4A and 4B, these forces can be resolved into a single force and moment acting at a central point say, 0, the center of the crankshaft. Because of the combined effects of the spatial separation of $F_1$ and $F_2$ and the time phase difference, $\theta$, therebetween, the resultant force, $F_R$, will lie along an axis not parallel to either $F_1$ or $F_2$. Further, the axis of the resultant moment, $M_R$, will not be parallel to or perpendicular to $F_1$, $F_2$, or $F_R$, but rather generally at an angle, $\phi_2$, from $F_R$, depending on the specific spatial angles $\phi_1$, lengths L, and time phases $\theta$ of the original forces. Note also that both $F_R$ and $M_R$ are reciprocating, that is both have spatially-fixed actions and time-variant magnitudes.

Figures 5A, 5B:
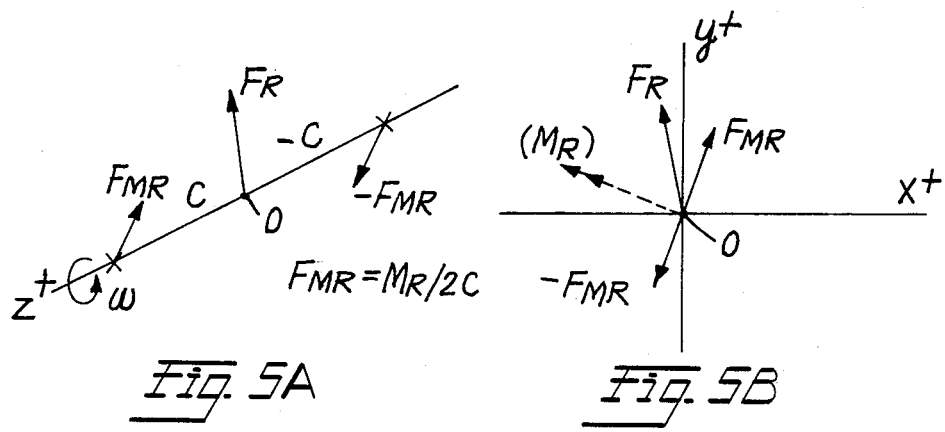
FIGS. 5A and 5B are diagramatic sketches illustrating the resultant moment ($M_R$) of a couple of forces disposed along the crankshaft around point "0"

As illustrated in FIGS. 5A and 5B, the moment, $M_R$, can be further resolved into a couple of forces disposed equal distances to either side of "0" along the crankshaft. These forces, $F_{MR}$, $-F_{MR}$, as well as $F_R$ are all reciprocating (i.e., fixed-axis, time-variant magnitude) forces, which can be represented as component pairs of counter-rotating, fixed magnitude forces.

Of these resolved imbalance forces, $F_R$ can be balanced in accordance with prior art balancing systems as described. However, all such prior art systems of which we are aware require either two full-length (i.e. of similar length to crankshaft) shafts or complex gearing to accomplish the task.

Figures 6A, 6B:
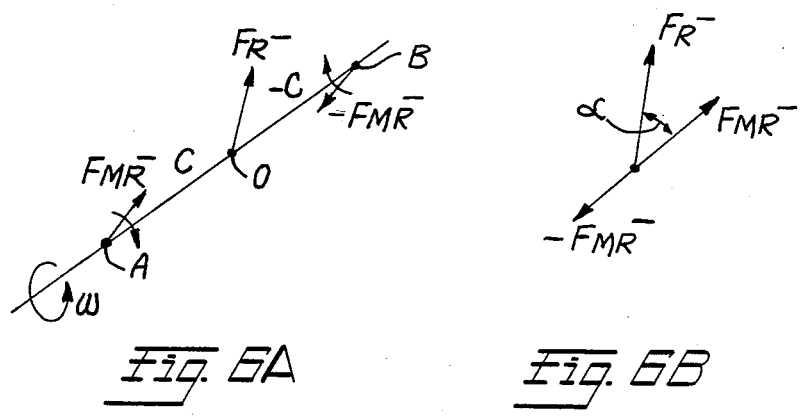
FIGS. 6A and 6B are diagramatic sketches showing various counter-rotating forces.

In accordance with the present invention, balancing weights are arranged in a balancing system without full-length shafts according to a new principle which causes the residual moment, to be minimized to a substantially lower magnitude than with known prior art arrangements. The components $F_R+$, $F_{MR}+$, $-F_{MR}+$ of $F_R$, $F_{MR}$, and $-F_{MR}$, which rotate with the crankshaft, are first balanced with crank-mounted weights in a known manner. Rather than fully balancing the resolved imbalance force, $F_R$, by evenly dividing $F_B-$ between the two reverse-rotating weights on diametrically-opposites sides of the crankshaft, that balancing force $F_B-$ is used to substantially offset the imbalance moment, $M_R-$, in the following manner. FIG. 6 shows the components of $F_R$, $F_{MR}$, and $F_{MR}$ (as identified in FIG. 5) which rotate opposite to the crankshaft rotation. Such components are derived from $F_R$, $F_{MR}$, $-F_{MR}$. It can be seen that since $F_{MR}-$ and $-F_{MR}-$ are necessarily 180° apart (around their axis of rotation), that $F_R-$ must be substantially in the same direction (viewed along the rotation axis) as one or the other of $F_{MR}-$ or $-F_{MR}-$, where "substantially in the same direction" means that the angle, $\alpha$, subtended between their directions when viewed along their rotation axis is less than 90° (approximately). In FIG. 6, this relation is shown for $F_R-$, $F_{MR}-$.

Then, if the balance force, $F_B-$, is applied not at point "0", nor in equal parts symmetrically fore and aft along the shaft axes from "0", but rather all at the point of application of the couple force ($F_{MR}-$ or $-F_{MR}-$) which is substantially in the same direction as $F_R-$ (i.e., point A in FIG. 6), then a new moment, $M_{FB} = F_B \cdot C$ is created which tends to counteract the original imbalance moment $M_R$.

If angle $\alpha$ is equal to zero, it is possible for a complete balance to be achieved in the following manner. Since $F_R-$, $F_{MR}-$ and $-F_{MR}-$ are co-planar when $\alpha = 0$, they can be further resolved to a single force, $F_D-$ with the same magnitude as $F_R-$, but acting (in a parallel direction to $F_R-$) at a distance D, where $D = (F_{MR}-/F_R-) \cdot 2C$. That is, the moment about "0" caused by moving $FR^-$ away a distance D must exactly equal the moment $M_R-$ caused by $F_{MR}-$ and $-F_{MR}-$ spaced at C and $-C$ from "0", respectively.

Then in order to balance $F_D$ using a balancing arrangement which does not employ full length shaft, the forces, $F_B-/2$, caused by the balancing weights, must be located such that a line drawn through the points where their axes of rotation pass also passes through point D, where $F_D-$ acts. Such a line is called here a "virtual balancing axis."

If, however, angle $\alpha$ is not equal to zero, then this total balance is not possible, because the force $F_R-$ and moment $M_R-$ cannot be resolved to a single force as shown in FIG. 7. Rather, it becomes necessary to minimize the imbalanced moment, $M_u-$, by careful location of the balancing weights in accordance with this invention.

When $F_B-$ is applied to balance $F_R-$, it would according to known prior art, be applied at the same point "0" where $F_R-$ acts. If, however, $F_B-$ is applied at a distance, D, along the rotation axis, then a new moment, $M_B-$, is created where $M_B- = F_B- (D)$. Because $\alpha$ is not equal to zero, this moment $M_B-$ cannot totally oppose and cancel $M_R-$. Angle $\alpha$ exists between $M_B-$ and $M_R-$, as it does between $F_R-$ and $F_{MR}-$. FIG. 8 shows the sum of $M_B-+M_R-$ where the unbalanced moment, $M_u-=M_B-+M_R-$. The formula, by law of cosiness, for $M_u-$ is:

$$M_U=\sqrt{(M_B-)^2+(M_R-)^2-2M_B-M_R-\cos\alpha} \quad (5)$$

Then, to minimize $M_u-$, we take $dM_u-/d\,D$, to find D associated with the smallest $M_U-$.

$$\frac{dMu-}{dD} -2\,(F_B-)^2 D - 2F_B - M_R - \cos\alpha. \quad (6)$$

So, $$D_{Mu-(minimum)} = \frac{M_R-}{F_B}\cos\alpha \quad (7)$$

That is, to assure, minimum unbalanced moment (and thereby to minimize eventual residual moment), $F_B-$ should be applied at distance $D_{mu}-$minimum. Note that at $D_{Mu-(minimum)}$ the component of $M_R-$ in the direction of of $M_B-$ equals $M_B-$.

Now, to balance the unbalanced moment, $M_u-$, a couple of forces is generated by placing balance weights, $F_u-$, an equal distance fore and aft of point "O" along the rotation axis. For convenience, and to utilize only two weights, total, that distance is chosen to be D, $-D$, such that the added weight at D can be combined with the weight generating $F_B-$. The total system of ideal balancing vectors is shown in FIG. 9 for the reverse-rotating components (recall those components rotating with the crankshaft are balanced in a known manner with the counterweights on the crankshaft). Again, the line connecting $Fu-$ at $-D$ with $F_u-$ at D is a virtual balancing axis which must also pass through "O". It can be seen that two residual reciprocating moments are left, $F_{B-}(L)$, and $F_{u-}(2L)$. However, in accordance with the foregoing described invention, the sum of these moments has been minimized.

From a study of FIGS. 9A and 9B it can be seen that the residual moments are directly dependent on distance L. If L equals zero, then residual moments are also zero. This would be the case when the balance weights are mounted concentric with the crankshaft as in U.S. Pat. No. 3,415,237 but complex gearing is required. The present invention minimizes this distance, L, so much as possible and utilizes minimum balancing weights that will thereby occupy minimum volume and so be capable of closest possible packing (minimum "L") next to the crankshaft to further reduce the magnitude of residual moments from that possible heretofore.

Moreover, the minimizing of the required balance weights and the localization of their application to two points at L, D and $-L$, $-D$ allows for the direct integration of these balance weights into preexisting rotating auxiliary equipment, such as oil pumps, water pumps, and the like, to thereby accomplish the desired balancing without addition of any parts other than those already required in an unbalanced engine, or in an engine which is balanced only with respect to crankshaft rotating imbalance components (i.e. counterweights mounted on the crankshaft only).

Figure 11:
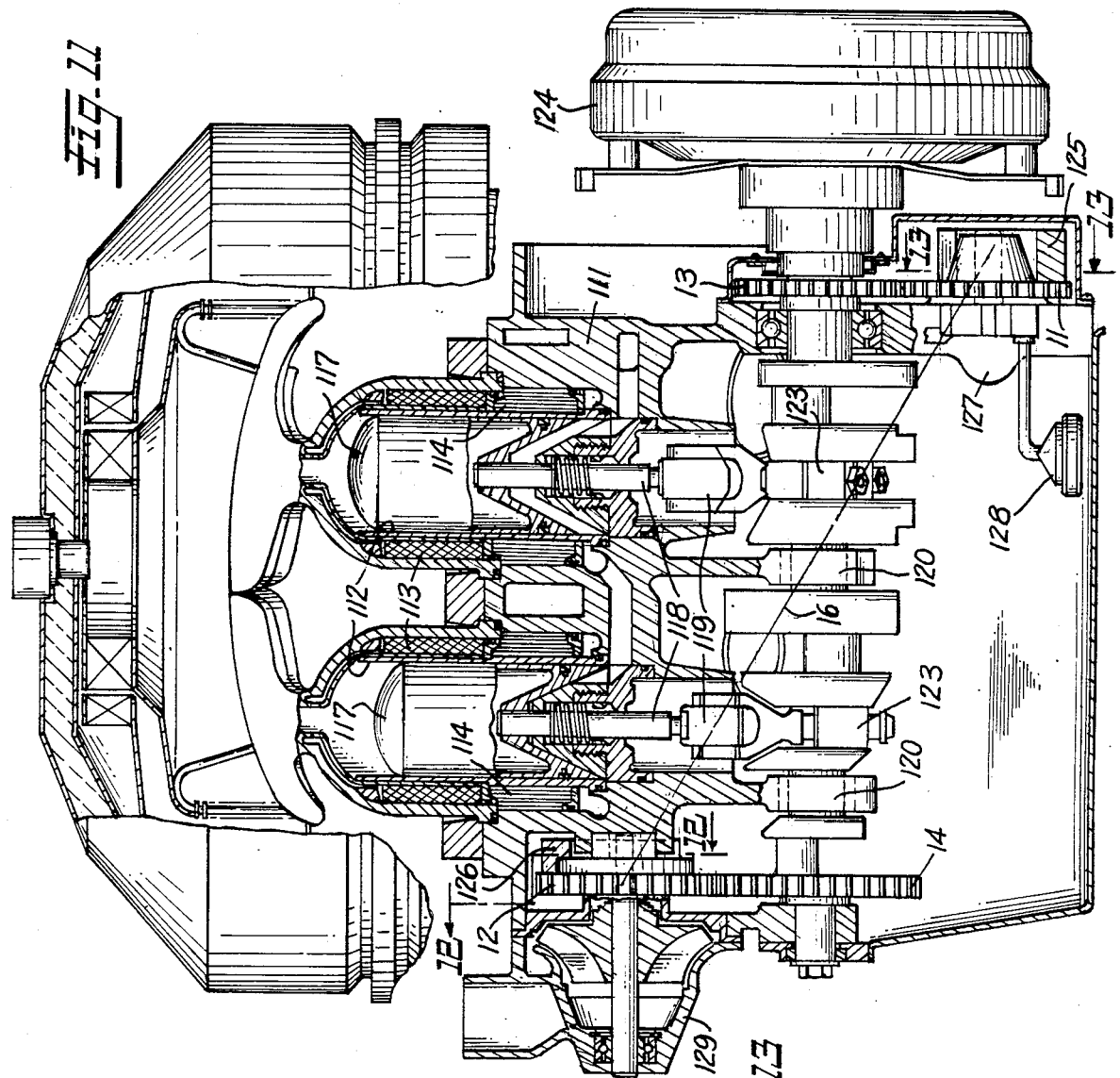
FIG. 11 is a longitudinal sectional view of the hot gas engine shown in FIG. 10 and further illustrates a preferred manner of implementing in a practical engine construction a virtual axis balancing arrangement according to the invention.

Referring now to FIGS. 10 and 11 of the drawings, wherein the balancing means of this invention is shown incorporated into a multi-cylinder, equal V type hot gas Stirling engine. For a more detailed description of the hot gas Stirling engine with which the balancing system of the present invention is incorporated reference is made to copending U.S. patent application Ser. No. 605,855 entitled, "Multi-Cylinder Hot Gas Engine"—by John A. Corey, Inventor, and which is assigned to the same assignee as this invention.

Briefly, the Stirling engine includes a V-shaped block portion 111 in which are formed four cylinders 112 with each cylinder being surrounded by a respective annular regenerator unit 113 and its serially connected annular cooler unit 114. The four cylinders 112 are provided with individual arcuate-shaped cylinder manifolds 115 and arcuate regenerator manifolds 116 which form respective outer and inner rings of manifold chambers. The manifolds 115 and 116 extend over the tops of all four cylinders. The arrangement of the manifolds 115 and 116 is such that the axial centers of the cylinders if extended up through the plane of the concentric inner and outer manifolds 115 and 116 would intersect the plane of the manifolds at points which are the corners of a parallelogram.

Each cylinder 112 has a piston 117 mounted for reciprocation therein. Piston 117 is connected by a piston rod 118 to a crosshead 119. Crosshead 119 moves up and down within a cylinder formed under the cylinder 112 in block 111 and is connected through a connecting rod 121 to a bearing 122 surrounding and driving a crank arm comprising part of a crankshaft 123. For a more detailed description of the construction of the piston 117, piston rod 118, crosshead 119, connecting rod 121 and its connection to the crankshaft 123, reference is made to copending U.S. patent application Ser. No. 605,782, entitled, "Lightweight Piston-Rod Assembly for a Reciprocating Machine" by John A. Corey and Michael M. Walsh, Inventors, filed concurrently with this application, and assigned to the same assignee as this invention.

As shown more clearly in FIG. 11 of the drawings, the crankshaft 123 of the engine is shown supported for rotation in the engine block by main bearings 120. In accordance with the usual practice to reduce vibration in reciprocating piston machines the crankshaft 123 is provided with suitable counterbalance weights. While this is a substantial improvement as compared to a non-counterbalanced crankshaft, there still remain relatively large residual imbalance forces and moments which rotate about the cylinder axis in a direction opposite the crankshaft rotation and which result in substantial vibration during operation.

In order to further reduce such vibration-producing forces the engine includes a balancing means in accordance with this invention comprising two counterbalance weights disposed a preselected distance, D, on either side of the center of action of the imbalance forces in the engine. The eccentric weights rotate at the same speed as the crankshaft but in a direction opposite to that of the crankshaft. These counter-rotating counterbalance weights are arranged to be driven from the crankshaft and disposed at selected distances on opposite sides of the axis of rotation of the crankshaft to create a single virtual balance axis which ideally intersects the crankshaft axis (i.e. the imbalance axis) at the center of action of the resolved imbalance forces and moments.

In order to create this single virtual balance axis identified as the axis 16 in FIG. 11, an appropriate eccentric weight 125 is driven from one end of crankshaft 123 through the gears 11 and 13. The gear 11 is secured to crankshaft 123 and meshes with the gear 13 to which is secured the eccentric weight 125. Eccentric weight 125 may be a separate member or it may be provided by a suitable eccentrically weighted working member of an auxiliary device such as an oil pump 127. Also, a similar eccentric weight 126 is driven from the opposite end of crankshaft 123 through gears 12 and 14. The gear 14 is secured to crankshaft 123 and meshes with the gear 12 to which is secured the eccentric weight 126. Eccentric weight 126 may also be provided by the working member of an auxiliary device such as, for example, a water pump 129. With the foregoing described arrangement the eccentric weights 125 and 126 are rotating at the same speed as that of the crankshaft but in a direction opposite to the direction of crankshaft rotation. Also, eccentric weight 125 is displaced laterally a selected distance to one side of the axis of rotation of crankshaft 123 and the eccentric weight 126 is displaced laterally a similar distance substantially on the opposite side of the axis of rotation of the crankshaft 123.

Also, in accordance with this invention to minimize the residual moment in the multi-cylinder reciprocating engine the eccentric weight 125 is disposed a distance D toward one end of the crankshaft from the center of action of the imbalance forces in the engine (which point may be, for example, the center of the crankshaft) and the eccentric weight 126 is disposed a similar distance D toward the opposite end of the crankshaft from such center of action, which distance D is determined in accordance with the following relationship:

$$D = \frac{M_R-}{F_B-} \cos \alpha \qquad (8)$$

Where:
- $M_R-$ equals the counter rotating component of the reciprocating imbalance moment;
- $F_B-$ equals the counter rotating balance force which balances the counter rotating component of the reciprocating imbalance force;
- $\alpha$ equals the angle substended between $F_R-$ and $F_{MR}-$; and
- $F_{MR}-$ equals the force components of moment $M_R-$ taken as a couple at distances D, $-D$ along the crankshaft.

By this construction, a virtual balancing axis indicated by the phantom line 16 is defined between the centers of rotation of the eccentric masses 11, 125 and 12, 126. The design is such that the virtual balancing axis 16 intersects the center of action of the residual imbalance forces in the main crankshaft 15 or as close thereto as possible.

With further regard to FIGS. 10 and 11, it should be noted that the driven gear wheels 11 and 12 which support the eccentrically mounted masses 125 and 126, respectively, also serve to drive auxiliary equipment which is required in the hot gas engine system shown in these figures. In particular, the driven gear 11 also serves to drive the impeller of an oil pump 127 whose intake is shown at 128 for circulating lubricating oil to particular critical parts of the engine that require forced lubrication. If desired, the impeller of the oil pump 127 may itself be arranged as the eccentric weight 125 or the eccentric weight 125 may be carried by such impeller. The driven gear wheel 12 also additionally serves to drive the impeller of a water pump shown at 129 for circulating cooling water to the cooler of the hot gas engine. Again, if desired, the impeller of the water pump 129 may itself be arranged as the eccentric weight 126, or the eccentric weight 126 may be carried by such impeller.

Figure 12:
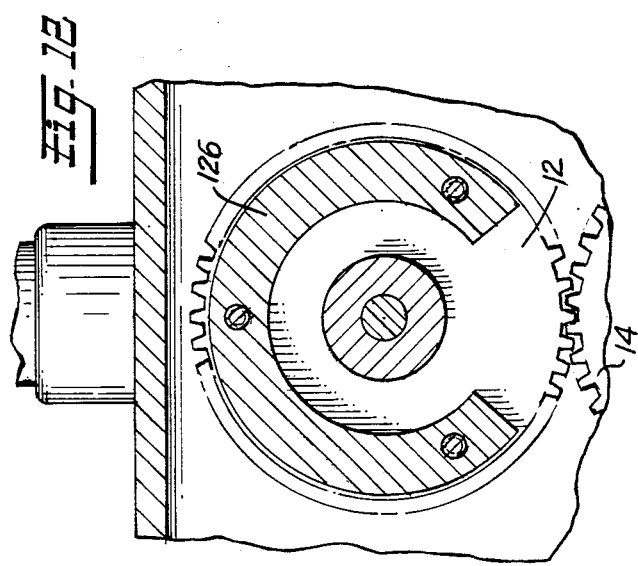
FIG. 12 is a partial cross sectional view taken through lines 12—12 of FIG. 11.
Figure 13:
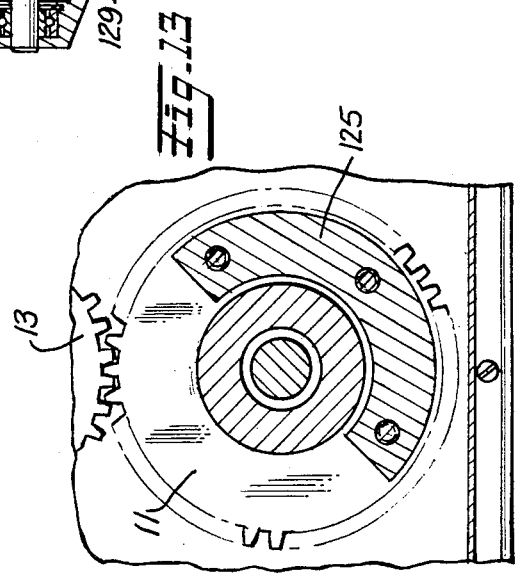
FIG. 13 is a partial sectional view taken through lines 13—13 of FIG. 11.

Thus, it should be appreciated that the novel virtual balancing axis arrangement made possible by the present invention provides for elimination of the imbalance forces and superior reduction of residual imbalance moments acting on a reciprocating piston and crankshaft engine system in comparison to balancing systems as taught by the prior art. Further such balancing system can be built into such engine systems at less expense due to the fact that it can incorporate into its design auxiliary devices normally found in such engine by appropriate location and design of such auxiliary drives. Thus, no additional component parts other than the eccentrically mounted masses themselves such as the weights 125 and 126 shown in FIGS. 12 and 13, are required to be added to such known engine systems. It is of course necessary for the designer of such engine systems to provide for appropriate space location within the housing of the engines to accommodate the necessary alignment of the interacting auxiliary drive as described above with relation to FIGS. 10 and 11.

From the foregoing description, it will be appreciated that the invention provides a novel virtual balancing axis arrangement for multi-cylinder reciprocating piston and crankshaft machine for effectively balancing out imbalancing forces and minimizing residual moments acting on the crankshaft of such machines without requiring the use of additional parallel-arrayed balancing shafts or complex, expensive, gearing arrangements. The novel virtual balancing axis arrangement is capable of being designed into reciprocating piston crankshaft machines for substantially reducing all vibrations induced in operation of such engines with only a minimum number of additional component parts, many of which may be available from operating components already required for operation of auxiliary equipment such as oil pumps, water pumps, and the like which are used in such reciprocating piston and crankshaft machines.

INDUSTRIAL APPLICABILITY

The invention described in this application can be used with multi-cylinder reciprocating piston and crankshaft machines such as piston hot gas engines of the Stirling engine type, piston driven internal combustion engines, piston compressor machines, and the like for effectively balancing out imbalance forces and reducing to a minimum any residual imbalance moments acting on the crankshaft of such machine without requiring the use of additional components such as parallel-arrayed balancing shafts or complex and expensive gear arrangements.

Having described one embodiment of a virtual balancing axis arrangement for multi-cylinder reciprocating piston and crankshaft machines constructed in accordance with the invention, it is believed obvious that other modifications and variations of the invention will be suggested to those skilled in the art in light of the above teachings. It is therefore to be understood that changes may be made in the particular embodiment of the invention described which are within the full scope of the invention as defined by the appended claims.

What is claimed is:

1. In combination with a multi-cylinder reciprocating machine of the type including a crankshaft mounted for rotation therein and which crankshaft is counterbalanced throughout so as to be in static and dynamic balance, a balancing system comprising:

(a) only two balance weights each appropriately sized and arranged to eliminate the force imbalance and to minimize the imbalance moments of said reciprocating machine;

(b) the first appropriately-sized balance weight being mounted for rotation at a distance D in an axial direction toward one end of the crankshaft from the center of action of the residual imbalance force and at a preselected distance on one side of the axis of rotation of said crankshaft and wherein said distance D is determined in accordance with the relationship $$D = \frac{M_{R-}}{F_{B-}} \cos \alpha$$

where:

$M_{R-}$ equals the counter rotating component of the reciprocating imbalance moment, $F_{B-}$ equals the counter rotating balance force which balances the counter rotating component, $F_{R-}$, of the reciprocating imbalance force, $\alpha$ equals the acute angle subtended between $F_{R-}$ and $F_{MR-}$, and $F_{MR-}$ equals the force components of moment $M_{R-}$ taken as a couple at distances D and $-D$ along the crankshaft axis;

(c) means for driving said first balance weight at the same rotational speed as that of said crankshaft but in the opposite direction;

(d) the second appropriately-sized balance weight being mounted for rotation at said same distance D but in an axial direction toward the opposite end of said crankshaft from said center of action of the residual imbalance force and at a preselected distance substantially on the other side of the axis of rotation of said crankshaft; and (e) means driving said second balance weight at the same rotational speed as that of said crankshaft but in the opposite direction, whereby there is created a virtual balance axis which passes through the centers of rotation of said first and second balance weights and intersects or as near thereto as possible the center of action of the residual force imbalance acting on said crankshaft.

2. The balancing system recited in claim 1 wherein the multi-cylinder reciprocating machine is an engine and said first and second balance weights are incorporated into auxiliary equipment already required in the running of the engine.

3. The balancing system recited in claim 2 wherein the working members of said auxiliary equipment constitute the balance weights.

4. The balancing system recited in claim 3 wherein one balancing weight is provided by the impeller of an oil pump and the other balance weight is provided by the impeller of a water pump.

5. The balancing system recited in claim 2 wherein the balance weights are carried by the working members of said auxiliary equipment.

6. The balancing system recited in claim 1 wherein said first and second balance weights are respectively coupled to said crankshaft by separate sets of driving and driven gear wheels with said balance weights being carried by the driven gear wheels.

7. The balancing system recited in claim 6 wherein the multi-cylinder reciprocating machine is an engine and the driven gear wheels which carry the balance weights also serve to drive auxiliary equipment already required in the running of the engine.

8. The balancing system recited in claim 7 wherein one piece of auxiliary equipment comprises an oil pump and the other comprises a water pump.

9. The balancing system recited in claim 1 wherein said first and second balance weights are driven from said crankshaft by gear means.

10. The balancing system recited in claim 1 wherein said first and second balance weights are carried by gear wheels mounted for rotation on stub-shafts mounted in but not extending axially throughout said engine and which gear wheels mesh with gear wheels mounted on said crankshaft.

11. In a multi-cylinder reciprocating machine having a crankshaft mounted for rotation therein which crankshaft is counterbalanced throughout so as to be in static and dynamic balance, the method of establishing a virtual balance axis for said machine operative to eliminate all residual imbalance forces and minimize the residual imbalance moments, comprising:

(a) determining a center of action of the imbalance forces and moments of the engine crankshaft due to reciprocating and rotating masses;

(b) providing only first and second appropriately sized eccentric masses each having a center of rotation;

(c) locating said first eccentric mass a preselected distance on one side of the axis of rotation of said crankshaft and at an axial distance D toward one end of said crankshaft from said center of action and said second eccentric mass a preselected distance on the opposite side of the axis of rotation of said crankshaft and at said same axial distance D, but toward the other end of said crankshaft from said center of action and wherein the distance D is determined in accordance with the relationship $$D = \frac{M_{R-}}{F_{B-}} \cos \alpha$$

Where:

$M_{R-}$ equals the counter rotating component of the reciprocating imbalance moment, $F_{B-}$ equals the counter rotating balance force which balances the counter rotating component, $F_{R-}$, of the reciprocating imbalance force, $\alpha$ equals the acute angle subtended between $F_{R-}$ and $F_{MR-}$, and $F_{MR-}$ equals the force components of moment $M_{R-}$ taken as a couple at distanced D and $-D$ along the crankshaft axis and wherein the centers of rotation of said first and second eccentric masses and said center of action all lie on a common virtual balance axis; and (d) causing said first and second eccentric masses to be rotated at the same rotational speed as that of said crankshaft but in a direction opposite such crankshaft rotation.

12. The method recited in claim 11 wherein said first and second eccentric masses are caused to be rotated by said crankshaft through gear means including drive and driven gears.

13. The method recited in claim 12 wherein the driven gears of said gear means carry said eccentric masses.

14. The method recited in claim 13 wherein said multi-cylinder reciprocating machine is an engine and wherein one or both of said driven gears also drives the working member of auxiliary equipment already required in the engine.

15. The method recited in claim 11 wherein said multi-cylinder reciprocating machine is an engine and said first and second eccentric masses are arranged as part of the working members of auxiliary equipment already required in the engine.

16. The method recited in claim 15 wherein the auxiliary equipment with which said first and second eccentric masses are arranged comprise an oil pump and a water pump.

* * * * *

UNITED STATES PATENT AND TRADEMARK OFFICE
CERTIFICATE OF CORRECTION

PATENT NO. : 4,545,341

DATED : October 8, 1985

INVENTOR(S) : John A. Corey & Michael M. Walsh

It is certified that error appears in the above-identified patent and that said Letters Patent are hereby corrected as shown below:

Column 2, line 39, change "$R_{R+}$" to --$F_{R+}$--.

Column 5, line 53, change "$\phi_1$" to --$\phi$--.

Column 6, line 44, change "$D=(F_{MR-}/F_{R-}).2C$" to --$D=(F_{MR-}/F_{R-})2C$--.

Column 6, line 17, change "$F_{MR}$" (2nd occurr.) to -- $-F_{MR}$--.

Signed and Sealed this

Third Day of December 1985

[SEAL]

Attest:

DONALD J. QUIGG

Attesting Officer

Commissioner of Patents and Trademarks